(No Model.) 2 Sheets—Sheet 1.
L. A. STANFORD.
STEAM POWER APPARATUS FOR SCREWING PIPES TOGETHER.
No. 397,400. Patented Feb. 5, 1889.
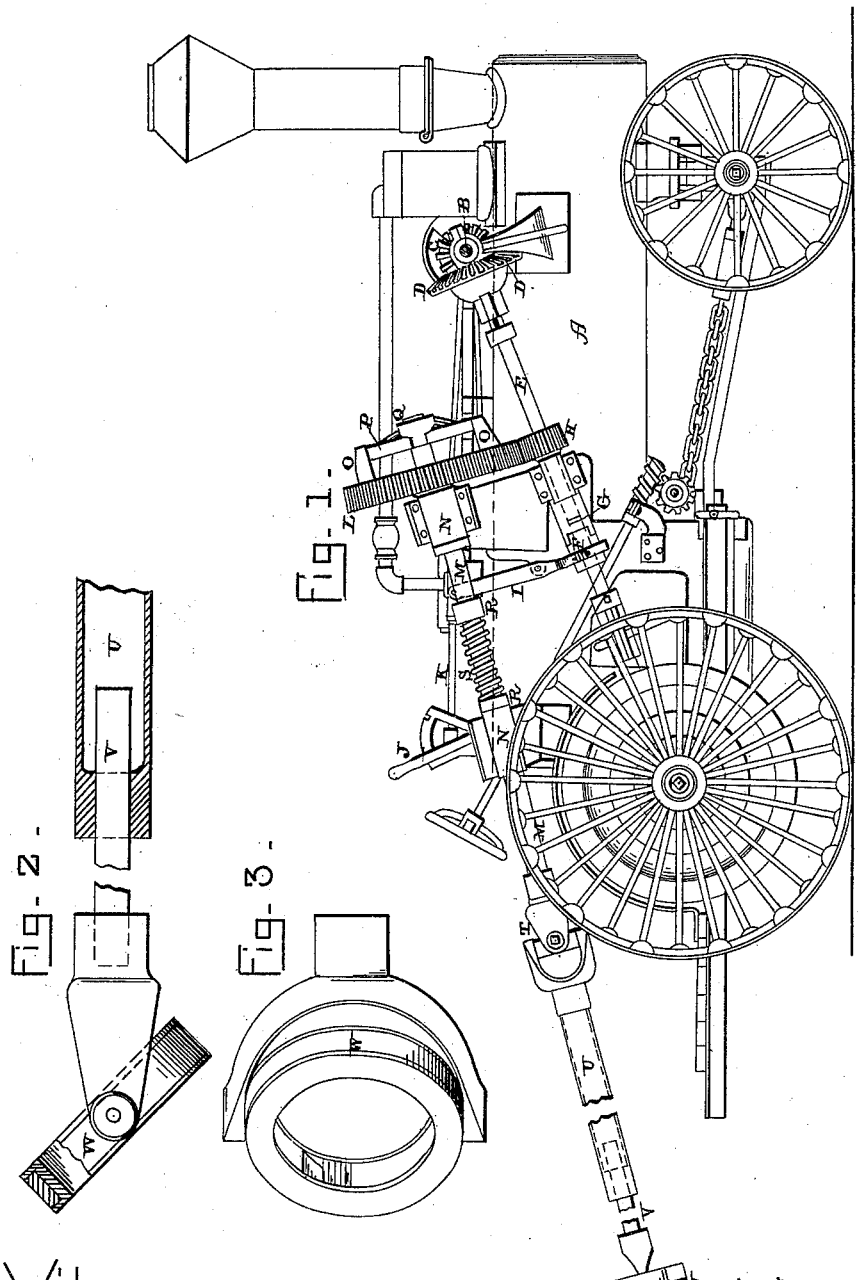

(No Model.) 2 Sheets—Sheet 2.

L. A. STANFORD.
STEAM POWER APPARATUS FOR SCREWING PIPES TOGETHER.

No. 397,400. Patented Feb. 5, 1889.

Witnesses:
E. P. Ellis
Benj. F. Cowl

Inventor:
Lewis A. Stanford,
per
H. H. North,
Atty.

UNITED STATES PATENT OFFICE.

LEWIS A. STANFORD, OF BRADFORD, PENNSYLVANIA.

STEAM-POWER APPARATUS FOR SCREWING PIPES TOGETHER.

SPECIFICATION forming part of Letters Patent No. 397,400, dated February 5, 1889.

Application filed June 1, 1888. Serial No. 275,788. (No model.)

*To all whom it may concern:*

Be it known that I, LEWIS A. STANFORD, a citizen of the United States, residing at Bradford, in the county of McKean and State of Pennsylvania, have invented certain new and useful Improvements in Apparatus for Screwing Pipes Together by Steam-Power; and I do hereby declare the following to be a full, clear, and exact description of the invention, such as will enable others skilled in the art to which it appertains to make and use the same.

My invention relates to an improvement in apparatus for screwing pipes together by steam-power; and the objects of my invention are to provide an apparatus or attachment for traction-engines whereby the pipes may be screwed together or disengaged from each other by steam-power; to utilize a traction-engine for screwing pipes together so that the engine can be driven along from one section of pipe to the other as they lie upon the ground; to provide the shaft to which the power is applied with one or more universal joints, so that the power can be applied to the pipe without having it in a direct line with the shaft; to provide the operating-shaft with a collar which can be adjusted in relation to the shaft, so that the engine can be used at different distances from the pipe; to make the driving-shaft adjustable endwise, so that it can move with the pipe as it is being screwed up or unscrewed, and to provide the collar with automatically-acting dogs, whereby they are made to engage or disengage with the pipe which is being acted upon.

Figure 1 is a side elevation of a machine embodying my invention. Figs. 2, 3, 4, 5, and 6 are detached views of the collar and its attachments.

Figure 4:
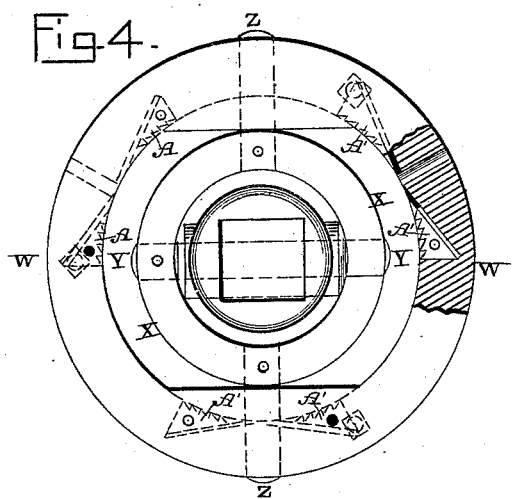
Figure 5:
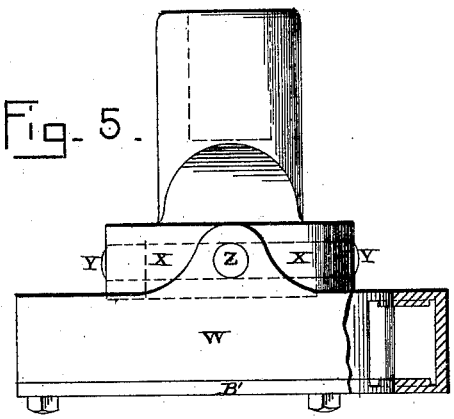
Figure 6:
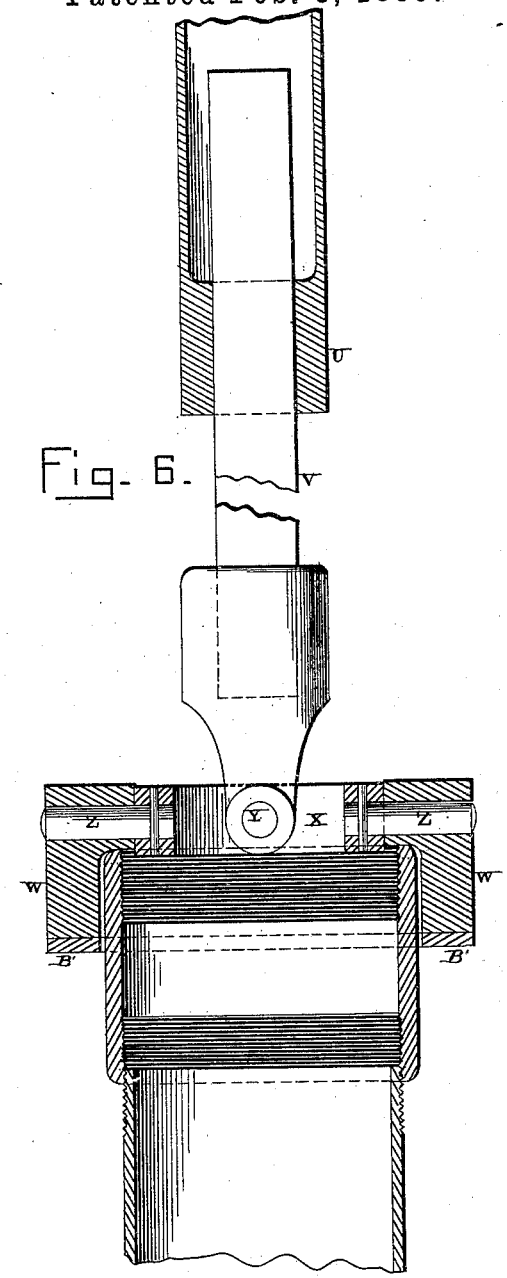

A represents an ordinary traction-engine, and B the driving-shaft, which is journaled upon its top in the usual manner. Secured to this horizontal shaft B is a pinion, C, which meshes with a beveled wheel, D, which is secured to the shaft E, which is journaled in suitable boxes or secured to any suitable part of the engine. This shaft E extends diagonally downward and is made in two separate parts, one of which is provided with a collar, G, and the other with a sliding clutch, F, which engages with the collar G, and which clutch F is operated by the levers I J and connecting-rod K, as shown. When the clutch F is thrown out of gear, the power of the engine is exerted in driving, through the pinion H and the wheel L, the driven shaft M. When the clutch is in gear, the power of the engine is exerted in propelling the machine forward in the usual manner, so as to be moved along from one section of pipe to another. The pinion H upon the shaft E meshes with the large wheel L, which is placed upon the shaft M, but which is not secured thereto. The shaft M is journaled in the boxes N, which are secured to suitable brackets upon the boiler, and has an endwise movement back and forth through them and through the wheel L, so that it can accommodate itself to the movement of the pipe whether it is being screwed up or unscrewed from another section. The wheel L is journaled upon the shaft M, and has projecting from its outer side the projections O, which as the wheel is made to revolve catch against the arms P, which extend outward from the collar Q, which is rigidly secured to the upper end of the shaft. As the wheel L is made to revolve by the pinion H, the projections O catch against the arms P and cause the shaft to revolve. As the shaft is caused to move endwise by the movement of the pipes which is being unscrewed, the arms move along the projections O either in or out, according to the direction the pipe or the coupling is being turned. In order to return this shaft M to position after having been moved endwise, there are placed upon it the two collars R, one of which is secured rigidly to the shaft and the other bears against the lower box, in which the shaft is journaled, and through which the shaft moves. Placed between these two collars R is a coiled spring, S, which is compressed as the shaft is moved outward by the pipe, and as soon as the shaft is disconnected from the pipe the spring returns the shaft instantly to position. The lower end of this shaft M is connected by a universal joint, T, either of the shape here shown or any other which may be preferred, with the hollow shaft U, which has an angular opening made through its lower end, and into which opening the extension-rod V passes. This rod V will be made of any desired length and is freely adjustable back and forth in the hollow shaft U for the purpose of allowing the cap W, connected to its lower end, to be applied to pipes at different distances from the engine, and thus avoid the necessity of having to move the engine always into a certain position. The universal joint T is used to connect the hollow shaft U to the shaft M, for the purpose of allowing the power to be applied to pipes placed in any position, no matter whether they are in or out of line with the shaft M. The extension-rod V is connected to the cap W by means of a universal joint of any suitable description. As here shown, this joint is composed of the ring X, which is loosely attached by the pivot Y, which extends entirely through it, and this ring X is in turn pivoted to the cap W by the pivots Z, which extend at a right angle to the pivot Y. This form of universal joint is here shown; but I do not limit myself to this or any other form of universal joint, as this may be varied at will without departing from the spirit of my invention. A universal joint at the cap and the universal joint T allow the greatest freedom of motion to the different parts and enable the power to be applied in any desired direction. The cap W consists of the main body or ring, which is provided with suitable grooved recesses in its inner side to receive the ratchets A' and the ring B', which is bolted thereto for the purpose of holding the ratchets in position. Both the ring B' and the body W are provided with grooves, in which the flanges of the dogs catch, so as to guide the dogs in their movements back and forth. Either one of two sets of dogs may be used at will. The two sets have their teeth turned in opposite directions, and one set is designed for screwing the pipes or other couplings in one direction, and the other for unscrewing them. The recesses in the inner side of the body W may be arranged as shown in Fig. 4 or in any other way that may be preferred. The dogs, having their outer surfaces provided with sharp ratchets, automatically engage with the pipe or coupling as soon as the cap is made to revolve. Those dogs which engage with the pipe or collar when they are being screwed up automatically disengage as soon as the machine is reversed. The cap is intended to be made to catch over the end of the pipe for the purpose of screwing it either directly to another section of the pipe or into a coupling which is connected to another pipe for screwing the couplings upon the pipes or for unscrewing the pipes or couplings, as may be desired. Of course, when the pipes or couplings are to be unscrewed, the motion of the engine and the driving-shaft will have to be reversed.

The construction of the cap and the operation of the dogs may be varied at will without departing from the spirit of my invention. Any form of clutching apparatus which will enable the power to be applied to the pipes or a pipe-coupling may be substituted for the cap here shown. The cap here shown simply embodies one form of my invention, and the construction of this cap may be varied at will.

Having thus described my invention, I claim—

1. The combination, with an engine, of a driving-shaft secured thereto and provided with a driving-pinion, the driven shaft provided with a wheel to gear with the said pinion, and a cap or clutching device which is to be applied to the pipe or pipe-coupling, and which is loosely connected to the driven shaft, substantially as shown.

2. The combination of a traction-engine with the shaft E, which is made in two parts and provided with the collar G, a clutch, and a lever for moving the clutch, with a pinion, a driven shaft, a wheel applied to the said shaft, and a cap or clutching device loosely connected to the said driven shaft, the shaft E being adapted to both propel the engine and to operate the driven shaft, substantially as described.

3. The combination, with the engine, of the shaft E, applied thereto and provided with a pinion, the driven shaft provided with arms at one end, and which is adapted to have an endwise movement, the wheel applied to this driven shaft and provided with projections to engage with the arms, and a cap or clutching device which is loosely connected to said shaft, substantially as set forth.

4. The combination of the engine, the shaft E, provided with a pinion, H, the wheel which meshes with the pinion, and the driven shaft which has an endwise movement through its boxes and the wheel placed thereon, the projections secured to the wheel, the arms upon the end of the shaft, the collar upon the shaft, the spring for returning the shaft to position after having been moved, and the cap or clutching device which is loosely connected to the shaft, substantially as specified.

5. The combination of the shaft M and its operating mechanism, the universal joint T, the shaft U, the extension-rod V, and the clutching device connected to its lower end, substantially as shown.

6. The combination of a clutching device, W, connected by a universal joint with the rod V, and a revolving shaft connected with the rod V for causing the clutch to revolve, substantially as described.

7. The combination of the shaft M, the universal joint T, the hollow shaft U, the extension-rod V, a universal joint at the lower end of the rod V, and a clutching device that passes over the end of a pipe or pipe-coupling, substantially as set forth.

8. The combination of the clutching device W, provided with dogs which engage with the pipe or coupling, the extension-rod V, and a universal joint between the rod and the clutch, substantially as specified.

9. The combination of the shaft M, a universal joint T, the shaft U, a connecting-rod which loosely makes connection with the shaft U and which slides back and forth in the shaft, a universal joint at the end of the rod, and the clutching device, substantially as shown.

10. The combination of the clutching device W, provided with recesses Y on its inner side, the automatically-acting ratchets A', the operating-rod for causing the clutching device to revolve, and the universal joint between the clutching device and the rod, substantially as described.

11. The combination of the driving-shaft E, a pinion applied thereto, the shaft M, provided with the wheel L, for meshing with the pinion, a universal joint, T, the shaft U, the rod P, clutch W, provided with ratchets A', a universal joint between the rod V and the clutch, substantially as set forth.

In testimony whereof I affix my signature in presence of two witnesses.

LEWIS A. STANFORD.

Witnesses:
H. G. MORROW,
J. F. WILSON.